(12) United States Patent
Froehlich et al.

(10) Patent No.: US 7,469,599 B2
(45) Date of Patent: Dec. 30, 2008

(54) FLOWMETER MOUNTED ON A CONTAINMENT

(75) Inventors: Thomas Froehlich, Münchenstein (CH); Achim Wiest, Weil am Rhein (DE); Torsten Strunz, Basel (CH)

(73) Assignee: Endress + Hauser FLowtec AG, Reinach (CH)

( * ) Notice: Subject to any disclaimer, the term of this patent is extended or adjusted under 35 U.S.C. 154(b) by 0 days.

(21) Appl. No.: 10/531,441

(22) PCT Filed: Oct. 15, 2003

(86) PCT No.: PCT/EP03/11399

§ 371 (c)(1),
(2), (4) Date: Nov. 15, 2005

(87) PCT Pub. No.: WO2004/036151

PCT Pub. Date: Apr. 29, 2004

(65) Prior Publication Data

US 2006/0117867 A1    Jun. 8, 2006

(30) Foreign Application Priority Data

Oct. 17, 2002    (DE) ................................. 102 48 593

(51) Int. Cl.
*G01F 1/66*    (2006.01)

(52) U.S. Cl. ................................. 73/861.27; 73/861.29
(58) Field of Classification Search .. 73/861.27–861.31
See application file for complete search history.

(56) References Cited

U.S. PATENT DOCUMENTS

| 4,431,936 | A  | * | 2/1984  | Fu et al. | ................... | 73/861.25 |
| 5,351,560 | A  | * | 10/1994 | Russwurm | ............... | 73/861.27 |
| 6,460,419 | B2 | * | 10/2002 | Su       | ........................ | 73/861.31 |
| 6,474,174 | B2 | * | 11/2002 | Su       | ........................ | 73/861.31 |

\* cited by examiner

*Primary Examiner*—Harshad Patel
(74) *Attorney, Agent, or Firm*—Bacon & Thomas, PLLC

(57) ABSTRACT

Flowmeter comprising at least two ultrasonic transducers that are mounted on a container which is penetrated by a medium in a certain direction of flow. The ultrasonic transducers alternately transmit and receive ultrasonic test signals in the direction of flow and counter to the direction of flow. The flowmeter further comprises a control/evaluation unit which determines and/or monitors the volume flow of the medium inside the container based on the difference in the travel time of the ultrasonic test signals propagating in the direction of flow and counter to the direction of flow. The ultrasonic transducers are configured such that they transmit and receive ultrasonic test signals or sound fields having a large aperture angle or a great beam expansion.

5 Claims, 1 Drawing Sheet

FLOWMETER MOUNTED ON A CONTAINMENT

FIELD OF THE INVENTION

The invention relates to a flowmeter having at least two ultrasonic transducers and a control/evaluation unit. The ultrasonic transducers are mounted on a containment, through which a medium is flowing in a certain stream direction. Based on the difference in the travel time of the measuring signals, which propagate in, and against, the stream direction of the medium, the control/evaluation unit determines the volume flow rate of the medium in the container.

BACKGROUND OF THE INVENTION

Ultrasonic flowmeters of the type described above, which determine the volume flow rate on the basis of the so-called travel time method, are used in many cases in process- and automation-technology. These flowmeters permit the volume flow rate in a containment, e.g. in a pipeline, to be measured contactlessly.

There is a differentiation between ultrasonic flow rate sensors, which are inserted into the pipeline, and clamp-on flowmeters, in which the ultrasonic transducers are clamped externally onto the conduit by means of a clamping mechanism. Clamp-on flowmeters are described, for example, in EP 0 686 255 B1, U.S. Pat. Nos. 4,484,478, or 4,598,593.

In the case of both kinds of ultrasonic flowmeters, the ultrasonic measuring signals are radiated, at a predetermined angle, into the containment in which the medium is located. In the case of inserted ultrasonic flow rate measurement pick-ups, the particular position of the ultrasonic transducer on the measuring tube is dependent on the inner diameter of the measuring tube, and on the velocity of sound in the medium. Since the inner diameter of the measuring tube is known from the fabrication, depending on application, at most the velocity of sound in the medium remains an only approximately known parameter.

In the case of clamp-on flowmeters, the wall thickness of the pipeline and the velocity of sound in the material are added as further application parameters. Relatively large errors can be associated with these parameters.

Depending on the application, in the case of clamp-on flowmeters, a still further source of error occurs. An ultrasonic transducer, which is used in the case of a clamp-on flowmeter, includes at least one piezoelectric element producing the ultrasonic measuring signal, and a coupling wedge. This coupling wedge is normally fabricated out of plastic, and, on one hand, serves for impedance matching and, on the other hand, for the protection of the piezoelectric element.

The ultrasonic measuring signals produced in a piezoelectric element are conducted through the coupling wedge, or a lead-in member, and the pipe wall, into the liquid medium. Since the velocity of sound in a liquid and in plastic are different from one another, the ultrasonic waves are refracted at the transition from one medium into the other. The angle of refraction itself is defined according to Snell's Law, that is, the angle of refraction depends on the ratio of the propagation velocities of the two mediums.

With coupling wedges, or lead-in members, made of plastic, a good impedance matching can be achieved; however, the velocity of sound in plastic exhibits a relatively high dependency on temperature. Typically, the velocity of sound in plastic varies from circa 2500 m/s at 25° C. to circa 2200 m/s at 130° C. In addition to the temperature-induced change in travel time of the ultrasonic measuring signals in the plastic of the coupling wedge, the direction of propagation of the ultrasonic measuring signals in the flowing medium also changes. Thus, both changes have an unfavorable effect on the accuracy of measurement of an ultrasonic transducer which functions according to the travel time method.

In the case of known flowmeters, the angular positioning of the ultrasonic transducers is predetermined. For the purpose of initial mounting, or in the case of later changes in application, it is necessary, on the basis of the above considerations, to adjust the mutual separation of the two ultrasonic transducers in a defined manner. For this, normally one of the two ultrasonic transducers is moved relative to the other until the position is established in which the intensity of the measuring signals received by the ultrasonic transducers is maximum. After the optimum separation of the two ultrasonic transducers is established by this trial-and-error method, the two ultrasonic transducers are then locked securely to the pipe wall in such established positioning. This method, of course, is relatively time consuming.

In addition to this, some of the application parameters, which, in the case of a clamp-on flowmeter, are necessary for the exact determination of the volume flow rate, are precisely known only in the rarest of cases; or, however, the establishment of these parameters is rather complex. While the establishment of the exterior diameter of the pipeline hardly causes problems, the exact determination of the wall thickness of the pipeline can be absolutely problematic. Furthermore, in many cases, neither the velocity of sound in the material of the pipeline, nor the velocity of sound in the medium is exactly known.

SUMMARY OF THE INVENTION

An object of the invention is to provide a cost-favorable apparatus for the highly precise determining and/or monitoring of volume flow rate in a containment.

This object is achieved by constructing the ultrasonic transducers such that they send and receive measuring signals, or sound fields, using large opening angles. Due to the spatially expanding emission- and receiving-characteristics, the ultrasonic measuring signals are radiated into, or received from, a wide angle range. In short, a defined, desired, beam spread takes place. Through this, the mounting location of the ultrasonic transducers is largely independent of the diameter of the pipeline, and of the velocity of sound in the medium flowing in the pipeline.

In general, it can be said that in accordance with an advantageous embodiment of the apparatus of the invention, the two ultrasonic transducers are arranged in a defined separation from one another, with the separation of the two ultrasonic transducers being dependent only on the opening angle of the measuring signals or sound fields; the separation of the two ultrasonic transducers is, however, independent of other system- and/or process parameters. These system- and process parameters important for high accuracy of measurement are, as mentioned above, the velocity of sound in the medium, the velocity of sound in the material of the pipeline, the wall thickness of the pipeline, or the inner diameter of the pipeline. The flowmeter is preferably a clamp-on flowmeter.

The sonic path (in, and against, the stream direction) used for determining and/or monitoring the volume flow rate of medium in the pipeline is predetermined by the location of the ultrasonic transducers on the pipeline, and not by the radiation direction of the ultrasonic transducers. For this reason, the initial mounting of the clamp-on flowmeter of the invention, in contrast to the solutions known from the state of the art, is greatly simplified. Furthermore, possible readjustments, which, up to now, were required in the case of known solutions as soon as process- or system changes occur, are unnecessary.

An especially cost-favorable embodiment of the apparatus of the invention provides that a piezoelectric element, which is installed in an ultrasonic transducer, is a disc-shaped piezoelectric element. An e.g. circular, disc-shaped piezo-electric element has an intrinsic opening angle γ, which is defined by the following mathematical formula: $\sin(\gamma)=1.22\,\lambda/D$, with λ denoting the wavelength of the ultrasonic measuring signals in the medium, and D denoting the diameter of the circular, disc-shaped piezoelectric element. Thus, for example, a desired beam spread can be achieved on the basis of the diameter of a piezoelectric element. An additional or alternative defocusing, and with it beam spread, is achieved, when an acoustic diverging lens is installed. Alternatively, an acoustic lens can be used, with attention being given that the ultrasonic measuring signals are not radiated into the pipeline, or received from out of the pipeline, in the focus of the lens.

In accordance with an advantageous alternative embodiment of ultrasonic transducers with broad radiating and receiving characteristics, multiple piezoelectric elements are provided as sending- and/or receiving elements, with the sending- and/or receiving elements being arranged in an array. Every desired radiating- and receiving characteristic, or beam spread, can be realized by means of an appropriate electronic control of the individual piezoelectric elements. Particularly, the control/evaluation unit controls the piezoelectric elements in the array, with each desired beam spread being realizable. Arrays of this kind are available for purchase as phased piezo-arrays, and are used in the fields of medical technology and materials testing.

In accordance with a preferred further development of the apparatus of the invention, the minimum separation of the two ultrasonic transducers is dimensioned such that the measuring signals, which are alternately sent from, and received by, the two ultrasonic transducers, in each case propagate along at least one sonic path in the containment through which the medium is flowing.

A great advantage of the apparatus of the invention is that the relative positions of the two ultrasonic transducers can be predetermined at the fabrication of the clamp-on flowmeter. Since the device then needs only to be secured on the pipeline, the adjustments necessary up to now, and the relatively expensive mounting aid, are omitted. For this reason, it is also possible for the first time that an installer can operate the clamp-on flowmeter of the invention without special electrical knowledge. Through this, time and money are saved.

In order to achieve a heightened level of measuring certainty, an advantageous embodiment of the apparatus of the invention provides that the minimum separation of the two ultrasonic transducers and the opening angle of the measuring signals, or sonic fields, are dimensioned such that the measuring signals propagate along at least two sonic paths, with the two sonic paths differing in the number of traverses. The term "traverse" refers to the section of a sonic path along which a measuring signal crosses once through the containment.

In addition, this embodiment opens up still more extremely advantageous possibilities. It was already mentioned above that depending on the application, it is difficult to obtain the exact value of each individual process- and system parameter. One normally compensates by entering estimated values into the calculations—a method which is not necessarily associated with qualitatively high-grade measurement results. Alternatively, the application parameters, or the process- and system parameters, are obtained in a complex manner.

For this problem, an embodiment of the device of the invention provides a very reliable and simple solution: On the basis of the travel time of the measuring signals, which propagate in, and against, the stream direction on at least two different sonic paths in the containment through which the medium is flowing, the control/evaluation unit calculates at least one of the system- or process parameters which is necessary for determining the volume flow of the medium in the containment.

BRIEF DESCRIPTION OF THE DRAWINGS

The invention will now be explained in greater detail on the basis of the drawings, the figures of which show as follows.

DESCRIPTION OF THE PREFERRED EMBODIMENTS

Figure 1:
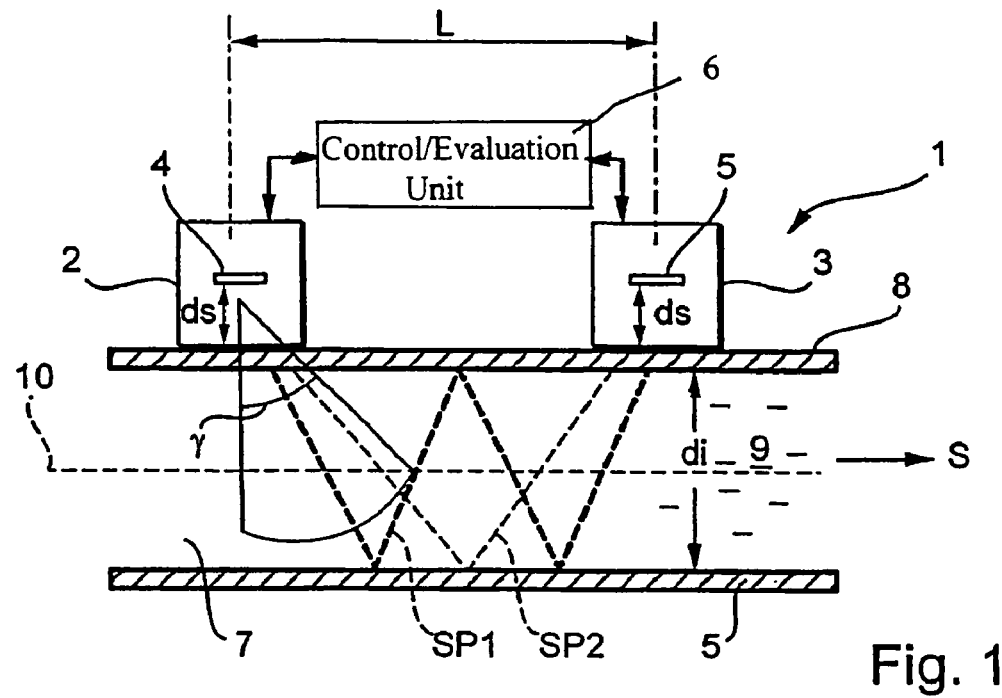
FIG. 1 a schematic illustration of a preferred form of embodiment of the apparatus of the invention.

FIG. 1 is a schematic illustration of a preferred form of embodiment of the ultrasonic flowmeter 1 of the invention. The flowmeter 1 in the illustrated case is a clamp-on flowmeter. The flowmeter 1 determines volume flow rate of the medium 9 in the pipe 7 basically according to the known travel-time-difference method.

Significant components of the clamp-on ultrasonic flowmeter 1 are the two ultrasonic transducers 2, 3 and the control/evaluation unit 6. The two ultrasonic transducers 2, 3 are attached to the pipe 7 by means of a mounting apparatus (not illustrated separately in FIG. 1). Appropriate mounting apparatuses are sufficiently known from the state of the art, and are also available from the assignee. The medium 9 flows through the pipe 7 of internal diameter di in the stream direction S.

An ultrasonic transducer 2, 3 has, as significant components, at least one piezoelectric element 4, 5, which produces and/or receives the ultrasonic measuring signals, and a coupling wedge. Via the coupling wedge, the ultrasonic measuring signals are coupled into, and out of, the pipe 7 through which the medium 9 is flowing.

The two ultrasonic transducers 2, 3 are formed such that they emit and receive ultrasonic measuring signals, or sonic fields, with a large opening angle γ, i.e. with a large beam spread. The separation L of the two ultrasonic transducers 2, 3 is thus dependent only on the, in principle, arbitrarily configurable opening angle γ of the ultrasonic measuring signals, or sonic fields. For this reason, the separation L of the two ultrasonic transducers 2, 3 can, if necessary, already be fixed at the time of fabrication, since it is independent of other system- or process parameters. These system- and process parameters are, for example, the inner diameter di of the pipe 7, the wall thickness w of the pipe 7, the velocity of sound cr in the material out of which the pipe 7 is fabricated, or the velocity of sound c in the medium 9. Through this, the installation costs are greatly reduced; later readjustments as a result of process- or system changes are unnecessary.

In accordance with the invention, the minimum separation Lmin of the two ultrasonic transducers 2, 3 can be dimensioned such that the ultrasonic measuring signals, which, according to the travel time difference method are alternately emitted from and received by the two ultrasonic transducers 2, 3, propagate along only one sonic path SP1, SP2 in the containment 7 through which the medium 9 is flowing.

FIG. 1 shows the preferred embodiment of the apparatus of the invention in which the minimum separation Lmin of the two ultrasonic transducers 2, 3, and the opening angle γ of the ultrasonic measuring signals, or sonic fields, are dimensioned such that the ultrasonic measuring signals propagate along at least two sonic paths SP1, SP2, with the two sonic paths differing in their number of traverses. The term "traverse" refers to the section of a sonic path SP1, SP2, along which an ultrasonic measuring signal crosses once through the containment 7.

Figure 2:
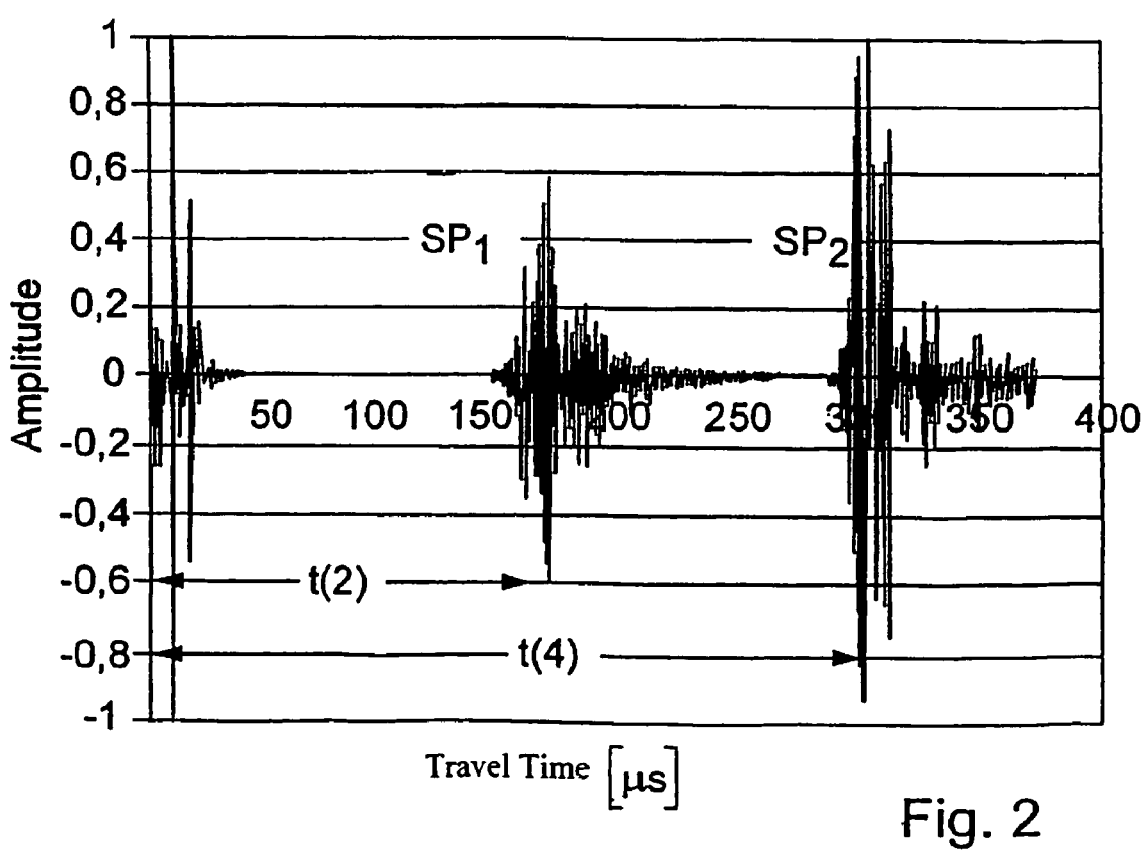
FIG. 2 a graph which displays amplitude of the ultrasonic measuring signals in an apparatus as in FIG. 1 as a function of travel time.

In the graph illustrated in FIG. 2, amplitude of the ultrasonic measuring signals, which propagate along the two sonic paths SP1, SP2 of FIG. 1, is plotted against travel time. On the basis of the travel time difference of the two ultrasonic measuring signals, the control/evaluation unit 6 calculates, on the one hand, the sought volume flow rate of the medium 9 through the pipe 7; on the other hand, it can also determine additional application parameters on the basis of the calculated values. The application parameters here are especially those which are normally determined by referring back to estimated values, since their exact determination would be connected with unreasonable effort. In the case of the arrangement of the ultrasonic transducers 2, 3 of the invention, it is possible to calculate system- and process parameters with a desired high accuracy on the basis of the travel time of measuring signals propagating along two different sonic paths SP1, SP2.

On the basis a mathematical model, an opportunity will now be illustrated in which unknown application parameters can be calculated on the basis of ultrasonic measuring signals which propagate in the medium 9 along two different sonic paths SP1, SP2, differing in the number of traverses n (see FIG. 1).

Let the measured travel time of a sonic path SP1, SP2 having n traverses be t(n). Application parameters are the pipe wall thickness w, the velocity of sound cr in the pipe, the internal diameter di of the pipe 7, and the velocity of sound c in the medium 9. The distance ds of a piezoelectric element 2, 3 to the pipe wall, the separation L, and the velocity of sound cs in the lead-in member 2; 3 are known parameters.

Let the initially unknown angles of a sonic path SP1, SP2 in the medium 9, in the pipe 7, and in the ultrasonic transducers 2, 3 be α(n), αr(n) and αs(n). For this situation, Snell's Law applies. To simplify matters, the index n has been left out of the equations. Thus the equations are:

$$\frac{\sin(\alpha)}{c} = \frac{\sin(\alpha s)}{cs} \text{ and} \tag{1}$$

$$\frac{\sin(\alpha)}{c} = \frac{\sin(\alpha r)}{cr} \tag{2}$$

The following model can be applied for the travel times:

$$t(n) = ts(n) + tm(n) \tag{3}$$

with $$tr(n) = \frac{2w}{cr \cos(\alpha r)}$$

being the travel time in the pipe, $$ts(n) = \frac{2ds}{cs * \cos(\alpha s)}$$

being the travel time in the ultrasonic transducers, and $$tm(n) = \frac{n * di}{c \cos(\alpha)}$$

being the travel time in the medium 9.

Furthermore:

$$L = Ls(n) + Lr(n) + Lm(n) \tag{4}$$

with the distances being Ls(n)=2ds tan(αs) in the ultrasonic transducer 2, 3,
Lr(n)=2w tan(αr) in the pipe 7, and
Lm(n)=n*di tan(α) in the medium 9 along the pipe axis 10.

Thus, for each sonic path SP1, SP2, four equations (1)-(4) result for three unknown angles. For each measured travel time, the equation system can thus be solved (numerically, if necessary) for one additional application parameter—for example, in the case of one sound ray, for c, if all other application parameters are known. If, as illustrated in FIG. 1 and FIG. 2, t(2) and t(4) are measured, then the equations can be solved for c and di in the case of known values w and cr.

The model can be simplified in that, in equations (3) and (4), one can approximate the travel times as well as the travel distances in the ultrasonic transducer 2, 3 and in the pipe 7. Then e.g. the following relationships are true:

$$Lr(n) \cong 0 \text{ and } Ls(n) \cong 0$$

As an approximation, the two equations (1) and (2) can remain unconsidered, with this approximation being justified for large inner diameters di of the pipe 7.

On the basis of the measurements, the travel times in the medium tm(n) are known from the equation (3), and the following holds:

$$L^2 = n^2 di^2 \frac{\sin^2(\alpha(n))}{\cos^2(\alpha(n))} \tag{5}$$

$$= n^2 di^2 \left(1 - \frac{1}{\cos^2(\alpha(n))}\right)$$

$$= n^2 di^2 - tm^2(n) c^2.$$

For travel time measurements with two traverses and four traverses, the velocity of sound c in the medium 9, and the inner diameter di of the pipe 7, respectively, can be calculated with the following two equations:

$$c = L \sqrt{\frac{3}{tm^2(4) - 4tm^2(2)}} \text{ and} \tag{6}$$

$$di = \frac{L}{2} \sqrt{\frac{tm^2(4) - tm^2(2)}{tm^2(4) - 4tm^2(2)}}. \tag{7}$$

The invention claimed is:

1. A flowmeter having:

at least two ultrasonic transducers, which are attached by clamping them on a containment, through which a medium is flowing in a stream direction, wherein the ultrasonic transducers alternately send and receive ultrasonic measuring signals in, and against, the stream direction; and a control/evaluation unit, which, on the basis of the travel time difference of the ultrasonic measuring signals propagating in, and against, the stream direction, determines and/or monitors the volume flow rate of medium in the containment, wherein:

said at least two ultrasonic transducers are constructed such that they send and receive ultrasonic measuring signals, or sonic fields, with a large beam spread, a minimum separation of said at least two ultrasonic transducers and the beam spread of the ultrasonic measuring signals, or sonic fields, are dimensioned with the result that the ultrasonic measuring signals propagate along at least two sonic paths, which differ in the number of traverses, wherein a traverse defines the section of a sonic path, along which an ultrasonic measuring signal crosses once through the containment; and said control/evaluation unit calculates at least one of the system-or process parameters necessary for determining the volume flow rate of the medium in the containment.

2. The flowmeter as claimed in claim 1, wherein:

the at least one system— or process parameter is the inner diameter of the containment, the wall thickness of the containment, the velocity of sound in the material of which the containment is fabricated, or the velocity of sound in the medium.

3. The flowmeter as claimed in claim 1, wherein:

each of said at least two ultrasonic transducer has at least one piezoelectric element as a sending— and/or receiving element.

4. The flowmeter as claimed in claim 1, wherein:

the flowmeter is a clamp-on flowmeter which is mounted on the outer surface of the containment.

5. The flowmeter as claimed in claim 1, wherein: the ultrasonic measuring signals propagate along at least two different sonic paths in and against the stream direction in the containment through which the medium is flowing.

* * * * *